United States Patent [19]
Drexel

[11] Patent Number: 6,138,990
[45] Date of Patent: Oct. 31, 2000

[54] FLOW CONTROL VALVE ASSEMBLY FOR MASS FLOW CONTROLLER

[75] Inventor: Charles F. Drexel, Rancho Palos Verdes, Calif.

[73] Assignee: DXL USA Inc., Torrance, Calif.

[21] Appl. No.: 09/275,708

[22] Filed: Mar. 25, 1999

[51] Int. Cl.[7] .................................................. F16K 31/00
[52] U.S. Cl. ...................................... 251/335.2; 251/318
[58] Field of Search ................................ 251/318, 335.2, 251/129.02, 129.14, 129.17; 137/901

[56] References Cited

U.S. PATENT DOCUMENTS

| | | |
|---|---|---|
| 4,558,587 | 12/1985 | Fruzzetti . |
| 4,852,605 | 8/1989 | Gouhier . |
| 4,911,405 | 3/1990 | Weissgerber . |
| 5,046,701 | 9/1991 | Barber ............................ 251/129.02 |
| 5,165,655 | 11/1992 | Drexel . |
| 5,617,894 | 4/1997 | Wolff . |
| 5,785,297 | 7/1998 | Ha . |
| 5,850,850 | 12/1998 | Mudd . |

FOREIGN PATENT DOCUMENTS 1012101  12/1965  United Kingdom ................ 251/335.2

*Primary Examiner*—Kevin Shaver
*Assistant Examiner*—John P. Welsh
*Attorney, Agent, or Firm*—Edward Gray

[57] ABSTRACT

A fluid valve assembly including a ball valve within a central hole in a resilient disc-shaped spring. The spring has additional openings to minimize resistance to fluid flow from inlet to outlet. Clearance between the spring and side walls of the cavity within which it is mounted allows the ball to center itself in its seat. The central hole diameter, ball diameter and separation between the spring and seat are selected to create an upward force on the ball over its entire stroke which provides a frictional force between the spring and a supporting lip to minimize radial motion of the spring to keep the ball aligned. The force also overcomes the weight of the ball in applications where the inlet pressure is very low, and also overcomes adhesion of the ball to the seat. The assembly is incorporated in a mass flow controller typically used with semiconductor fabrication processes.

18 Claims, 2 Drawing Sheets

FLOW CONTROL VALVE ASSEMBLY FOR MASS FLOW CONTROLLER

BACKGROUND OF THE INVENTION

1. Field of the Invention

The present invention relates to fluid valve assemblies, and more particularly to a flow control valve assembly for a flow controller which can measure and control the mass flow of gases.

2. Description of the Related Art

The measurement and control of the mass flow of gases is important in many industries. During the manufacture of semiconductor chips, for example, many of the processes require precise reaction of two or more gases under carefully controlled conditions. Since chemical reactions occur at the molecular level, control of mass flow is the most direct way to regulate the absolute and relative quantities of gaseous reactants.

There have been developed in the art a variety of instruments for measuring the mass flow rate of gases from less than one standard cubic centimeter(s) per minute (seem) to more than 500,000 seem. The prevalent design of such instruments requires that flowing gas be routed through a sensor assembly, where the mass flow is measured, which includes a capillary tube around which are wound two resistance thermometers as identical as possible in electrical and mechanical characteristics. Each thermometer is wound in a tight coil in thermal communication with the outer surface of the tube. The thermometers form two legs of an electronic bridge; the other two legs are usually fixed resistors. When a voltage is applied across the bridge, current flows through each thermometer, causing it to self-heat. When there is no flow of gas through the capillary tube, the thermometers heat up identically. As gas begins to flow through the tube, the gas first cools the upstream thermometer and then the downstream thermometer, which is cooled less because the gas is now slightly warmer due to heating by the upstream thermometer. The resultant temperature differential is a function of both the mass flow rate and the properties of the particular gas.

After passing through the sensor assembly, the gas flows through a valve assembly which precisely controls the mass flow of the gas. In existing valve assemblies, the valve element typically may be either a ball that cooperates with a conical seat or a flat plate adapted to engage a raised and rounded scat. Balls are preferred because they are usually less expensive, simpler and more precise than flat plates. This is because there is a large supply of low cost standard balls made to a sphericity of 10 millionths of an inch or better on modern ball grinding machines. Also, it is very easy to produce ball seats to similar tolerances using simple coining techniques or commercially available jewels. Conversely, flat valve elements are specially made and do not benefit from standardization. The raised and rounded seats used for flat valves are difficult to make and even more difficult to repair if physically damaged.

In any case the valve element and seat must be sealed from impurities in the external atmosphere. This is sometimes accomplished by either a flexible diaphragm or bellows welded in place. Gas flow is controlled by an external actuator operable to press on the flexible member to seat the valve element and thereby close the valve. Differential gas pressure or a spring provides the opening force.

Some semiconductor manufacturing processes, such as ion implantation, require that precise small portions of gas be admitted into a vacuum chamber, so the mass flow controller must be able to operate at very low pressure. Other processes require gases at high inlet pressures. Thus, there is a need for a valve assembly which can operate reliably and precisely over a wide range of flow rates and system pressures.

In the manufacture of semiconductor devices, and especially those having features of one micron or less, the reactant gas must not only be carefully controlled but also completely free from contaminants. Particles such as dust, metal and lint, vapors from moisture, solvents and oil, and contaminant gases such as air and extraneous process gases can spoil the products. It is therefore important that the flow passages used in mass flow controllers neither trap such contaminants and subsequently release them to the gas stream, nor generate contaminants during calibration and operation.

Typically, friction causes gas valves to deteriorate and generate undesirable small particles which contaminate the reactant gases. One source of contamination in existing gas valves is the frictional engagement between the ball valve and the walls of the guiding members retaining the ball. Particles thus generated may become trapped in the pocket surrounding the ball and resist removal by purge gases periodically introduced to sweep the gas path. Also, when valves are used as part of a control system to regulate the flow of gases, friction and particulate matter can cause undesirable hysteresis in the control system.

U.S. Pat. No. 5,165,655 ("'655"), entitled "Flow Control Valve Assembly Minimizing Generation and Entrapment of Contaminants," which is incorporated herein by reference in its entirety, discloses four embodiments of a valve assembly including a valve element retainer permitting alignment between a ball valve element and its seat, while minimizing friction and the generation and entrapment of particles which could affect the chemical process or impede ball motion. In all the embodiments, the inlet port through which gas enters the valve assembly terminates in a valve seat, and the ball is either loosely coupled or rigidly attached to a first portion of a flexible retainer which guides the motion of the ball, relative to the seat, between its open and closed positions. A second portion, extending from the first, is rigidly attached to the valve assembly body.

Although the retainers in these embodiments can provide substantial radial restraint on a ball element to maintain alignment, it was found impractical to hold the manufacturing tolerances on elements close enough for the valve assemblies to work reliably. Another shortcoming of these embodiments is that with the ball in the normal (closed) position, contaminant deposits tend to build up on the ball lower surface and seat at the small space between the ball and seat so that the ball adheres to the seat. Particularly troublesome is tungsten hexafluoride ($WF_6$) gas which reacts with minute traces of water vapor to form tungsten tetrafluoride ($WF_4$), which solidifies to form a strong glue. It was found that if the retainer has a low spring rate, to allow self-centering, it is too weak to break the adhesive bond, necessitating a blast of high pressure gas to free the ball. If a spring to lift the ball is not provided, in some applications where the mass flow controller is interposed between an adsorption-type storage container of process gas and a vacuum chamber, gas typically will cease flowing when the inlet pressure falls below 2 Torr, because that much pressure is needed to lift the ball off the seat. Because the amount of gas in such containers varies non-linearly with pressure, it is essential to be able to operate at the lowest possible pressure to avoid wasting gas and having frequent shutdowns.

It is therefore an overall object of the present invention to provide a valve assembly for a mass flow controller which can, over a wide range of system pressures down to a hard vacuum, measure and control the mass flow rates of gases used in semiconductor fabrication processes.

A more specific object of the invention is to provide a valve assembly wherein a ball valve element can be precisely and reproducibly centered within a valve seat.

A further object of the invention is to provide a valve assembly in which hysteresis due to valve element friction is minimized.

Still another object of the invention is to provide a valve assembly for a mass flow controller which can admit into a high-vacuum chamber substantially all the adsorbed gas stored in a container.

Other objects of the invention will become evident when the following description is considered with the accompanying drawings.

SUMMARY OF THE INVENTION

These and other objects are met by the present invention which in one aspect provides a combination in a fluid valve assembly which includes a valve body having a cavity and inlet and outlet passages in fluid communication with the cavity. The cavity is determined by a circumferential side wall and a bottom wall. The side wall has a circumferential lip parallel to and at a preselected height above the bottom wall. The inlet passage opens into the cavity at an inlet port in the bottom wall, and the inlet port has a valve seat with a circular aperture. The combination further includes a spherical valve element within the cavity adapted to engage the seat to thereby close the inlet port. The valve element is displaceable relative to the aperture between an open position determined by a preselected separation between the element and aperture, and a closed position wherein the element engages the seat, thereby closing the inlet port.

The combination further includes means for providing an upward force on the valve element at any position between and including the open and closed positions[, and means for keeping the valve element aligned with the valve seat at any position between the open and closed positions. The combination further includes means for allowing the valve element to center itself in the seat, and means for reducing pressure drop in the outlet passage].

In another aspect the invention provides a combination in a fluid valve assembly which includes a valve body having a cavity and inlet and outlet passages in fluid communication with the cavity. The cavity is determined by a circumferential side wall and a bottom wall. The side wall has a circumferential lip parallel to and at a preselected height above the bottom wall. The inlet passage opens into the cavity at an inlet port in the bottom wall, and the inlet port has a valve seat with a circular aperture. The combination further includes a spherical valve element within the cavity adapted to engage the seat to thereby close the inlet port. The valve element is displaceable relative to the aperture between an open position determined by a preselected separation between the element and aperture, and a closed position wherein the element engages the seat, thereby closing the inlet port.

The combination further includes means for aligning the valve element with the valve seat at any position between and including the first and second positions. The means includes means for allowing the valve element to center itself in the valve seat as the valve element approaches the closed position.

In still another aspect the invention provides a combination in a fluid valve assembly which includes a valve body having a cavity and inlet and outlet passages in fluid communication with the cavity. The cavity is determined by a circumferential side wall and a bottom wall. The side wall has a circumferential lip parallel to and at a preselected height above the bottom wall. The inlet passage opens into the cavity at an inlet port in the bottom wall, and the inlet port has a valve seat with a circular aperture. The combination further includes a spherical valve element within the cavity adapted to engage the seat to thereby close the inlet port. The valve element is displaceable relative to the aperture between an open position determined by a preselected separation between the element and aperture, and a closed position wherein the element engages the seat, thereby closing the inlet port.

The combination further includes means for reducing pressure drop in the outlet passage.

In yet another aspect the invention provides a fluid valve assembly including a valve body having a cavity and fluid inlet and outlet passages communicating with the cavity. The cavity is determined by an open side, a circumferential side wall and a bottom wall. The side wall has a circumferential lip parallel to and at a preselected height above the bottom wall. The inlet passage opens into the cavity at an inlet port in the bottom wall which has a valve seat with a circular aperture which is at a preselected distance from the bottom wall. The valve assembly further includes a flexible diaphragm across the open side of the cavity which seals and isolates the cavity. The diaphragm has an internal surface facing the cavity, and an external surface. The valve assembly further includes a ball valve element within the cavity, between the valve seat and diaphragm internal surface, which is continuously displaceable relative to the seat aperture between an open position determined by a preselected separation between the ball and aperture, and a closed position wherein the ball engages the seat. Displacement of the ball when not in the open position is constrained by contact between the diaphragm inner surface and the ball. The valve assembly further includes an actuator operatively associated with the diaphragm exterior surface which is movable to deflect the diaphragm and displace the ball from the open position. The valve assembly further includes a planar, circular spring having a central hole in which the ball sits, and a plurality of slots extending radially from the hole. The spring has a circumferential outer portion, circumscribed by the side wall, which has a lower surface resting freely on the lip. There is an annular clearance between the spring and side wall.

These and other features and advantages of the invention will become further apparent from the detailed description that follows, which is accompanied by drawing figures. In the figures and description, numerals indicate the various features of the invention, like numerals referring to like features throughout both the drawings and description.

DESCRIPTION OF THE PREFERRED EMBODIMENT

Figure 1:
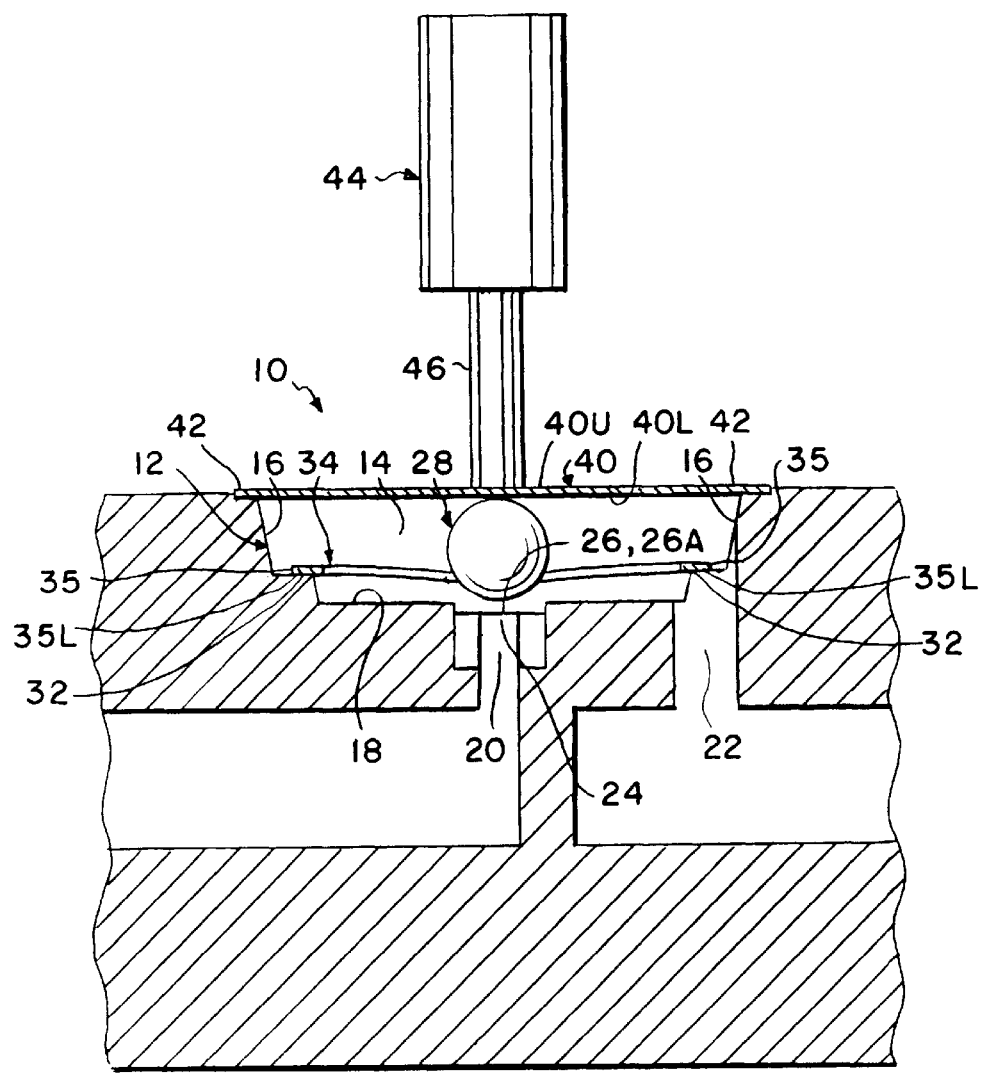
FIG. 1 is a schematic side elevation view, in cross section, of a valve assembly incorporating the features of the present invention, including a positioner spring to lift a ball valve element from its valve seat.

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the invention as expressed in the appended claims. Structural and functional details are not necessarily to be interpreted as limiting, but as a basis for the claims. For example, while the valve assembly of the present invention is described with regard to mass flow control instrumentation, the assembly may also be incorporated into volume flow instrumentation or into any device where it is desired to take advantage of its flow regulation characteristics and freedom from hysteresis.

Referring to FIG. 1, a valve assembly 10 in accordance with the invention includes a valve body 12 having a cavity 14 determined by a downwardly tapering circumferential side wall 16 and a bottom wall 18. The valve body includes a gas inlet passage 20 and a gas outlet passage 22. Inlet passage 20 communicates with the cavity 14 at an inlet port 24 in the central portion of the bottom wall 18. Port 24 is circumscribed by a valve seat 26 for receiving a spherical ball valve element 28 adapted to engage the seat 26 whose circular aperture 26A may be, by way of example, sharp-edged or generally conical to at least substantially conform to the contour of ball 28.

Figure 2:
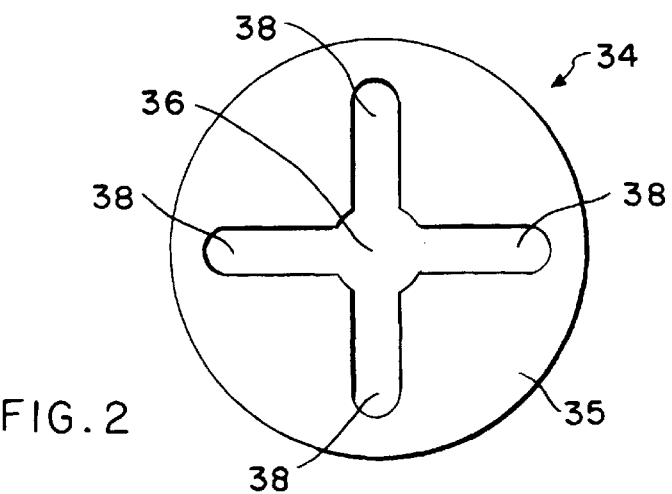
FIG. 2 is a top plan view of the FIG. 1 spring.

Side wall 16 includes a circumferential lip 32 disposed generally parallel and proximate to the bottom wall 18. A flat, generally circular, disc-shaped positioner spring 34 made of a metallic alloy has a circumferential outer portion 35 whose lower surface 35L contacts lip 32. Surface 35L is not rigidly attached to lip 32 so that the spring is free to move radially to allow the ball to center itself in the seat. Preferably, spring 34 is made of a corrosion resistant nickel alloy such as type 316 stainless steel. By way of example, a typical spring has a diameter of 0.46-inch and a thickness of 0.005-inch. As shown in FIG. 2, spring 34 has therethrough a central circular hole 36 extending radially into four symmetrically disposed slot-shaped openings bounded distally by outer portion 35, whose purpose is to allow gas to flow freely into outlet passage 22. Alternatively, other numbers and shapes of openings can be used, provided the resiliency of the spring is maintained. The center of hole 36 is directly over the center of seat 26, i.e., a line determined by the two center points is orthogonal to the parallel planes determined by hole 36 and seat aperture 26A, and also is orthogonal to the bottom wall 18. The diameter of hole 36 is slightly smaller than the diameter of ball 28 so that a portion of the ball protrudes below the spring when the ball is received within the hole. Preferably, the ball is made of a hard material such as a ceramic, synthetic ruby or sapphire, or stainless steel. By way of example, a typical ball has a diameter of 0.1875-inch (4.72 mm).

Referring again to FIG. 1, cavity 14 is closed by an isolating, flexible diaphragm 40 having an internal surface 40L facing the cavity and an external surface 40U. Diaphragm 40 is generally planar when unstressed by an external force. The diaphragm is welded or otherwise secured along a junction 42 to a surface of the valve body surrounding the cavity 14 to form a gas-tight seal and thereby isolate the cavity, the passages 20 and 22, the ball valve element 28 and the seat 26 from the outside atmosphere. Valve assembly 10 may be normally open or normally closed. The valve assembly is operated by an actuator 44 having a plunger 46 bearing against surface 40U of the diaphragm.

Figure 3:
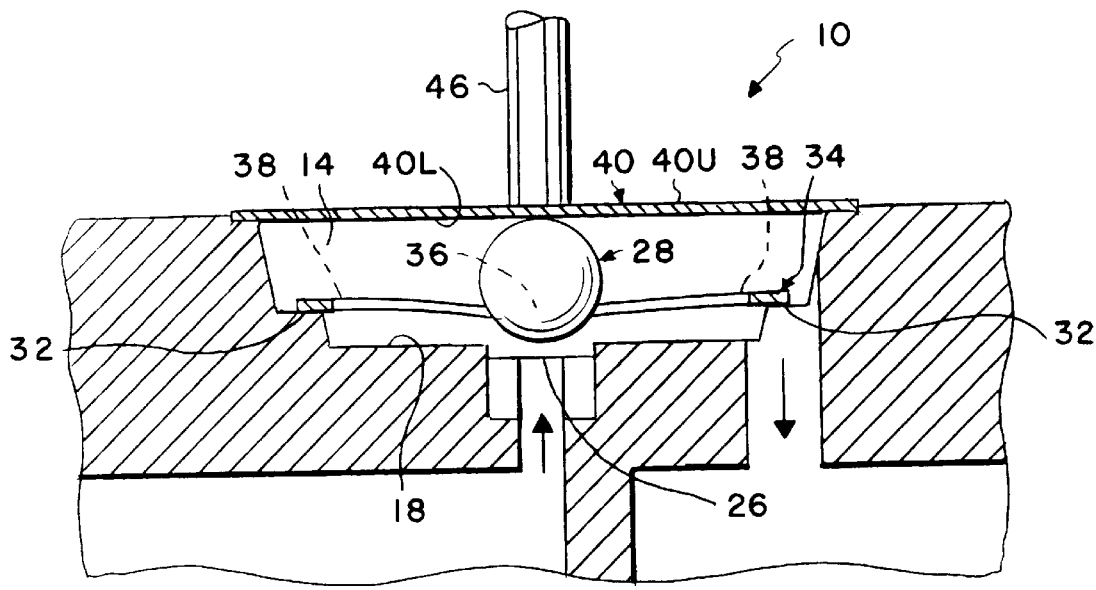
FIGS. 3 and 4 are side elevation views, in cross section, of a portion of the FIG. 1 valve assembly showing the ball in its open and closed positions, respectively.

FIG. 3 shows the open position. Ball 28 is held open against surface 40L by the upward force of spring 34. The diameters of the ball and hole 36 are selected so that with the ball disposed within the hole there is a predetermined space, typically about 0.004-inch, between valve seat 26 and the circumferential zone on the ball's surface determined by the horizontal small circle nearest to the seat. Arrow indicia indicate the direction of flow. In contrast to the embodiments of the '655 patent in their open position, spring 34 provides an upward opening force on the ball over its entire stroke. The desired space to be maintained between the ball and seat is achieved by preselecting the height of the lip 32 above bottom wall 18, and by choosing a stainless steel gauge which allows spring 34 to be resilient yet allows the ball to center itself with respect to seat 26. Also unlike the '655 embodiments where all the gas entering the cavity 14 can only flow between the ball and seat and around the ball, the present invention allows gas to also flow through the openings 38, thereby reducing pressure drop in outlet passage 22.

Figure 4:
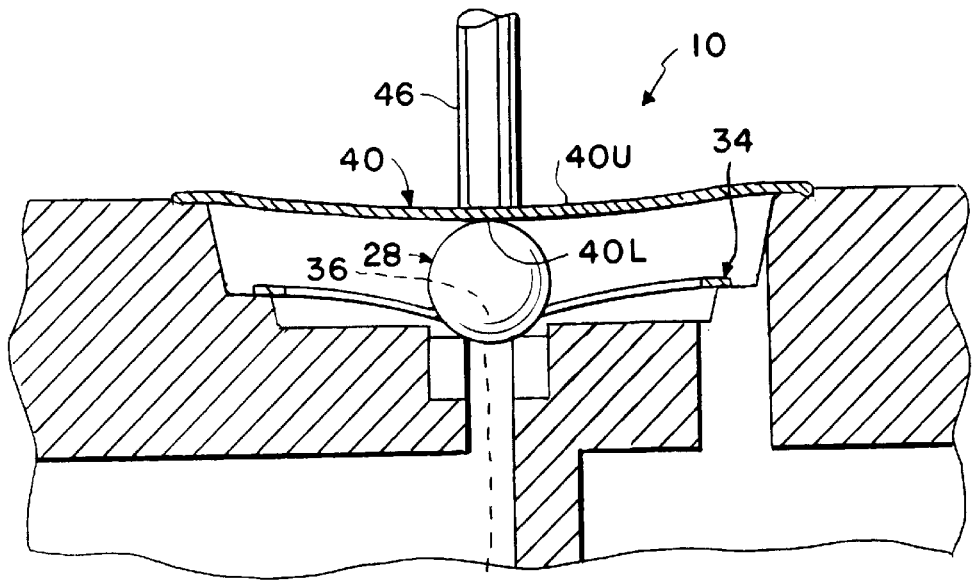

FIG. 4 shows the closed position. Plunger 46 exerts a predetermined pressure on surface 40U causing diaphragm 40 to flex inwardly so that surface 40L pushes against the topmost point of ball 28, thereby exerting a downward force on the ball which is transferred to spring 34 causing it to flex downwardly so that the separation between ball 28 and seat 26 decreases. Depending on the amount of pressure applied by the plunger, the flow of gas is either reduced or completely shut off. In contrast to the embodiments of the '655 patent, the ball tends to remain precisely aligned relative to the seat because the centers of hole 36 and seat aperture 26A maintain their alignment due to the force of the spring against the ball, and the resultant radial frictional forces between lower surfaces 35L and lip 32.

What is claimed is:

1. In a fluid valve assembly, the combination comprising:

a valve body having a cavity and fluid inlet and outlet passages communicating with the cavity, the cavity determined by a circumferential side wall and a bottom wall, the side wall having a circumferential lip disposed generally parallel to and at a preselected height above the bottom wall, the inlet passage opening into the cavity at an inlet port in the bottom wall, the inlet port having a valve seat with a generally circular aperture;

a generally spherical valve element of a preselected diameter disposed within the cavity and adapted to engage the seat to thereby close the inlet port, the valve element displaceable relative to the aperture between a first (open) position determined by a preselected separation between the element and aperture, and a second (closed) position wherein the element engages the seat, thereby closing the inlet port; and means for providing an upward force on the valve element at any position between and including said first and second positions.

2. The combination of claim 1, wherein:

said means for providing an upward force on the valve element comprises a generally planar, generally circular spring having therethrough a central circular hole of a preselected diameter less than the diameter of the valve element, and a circumferential outer portion with a lower surface, said outer portion bounded by a generally circular rim circumscribed by said side wall, said lower surface contacting said circumferential lip, the valve element disposed within the hole.

3. The combination of claim 2, wherein the valve element is a ball made of a material selected from the group consisting of ceramic, synthetic ruby, synthetic sapphire, and stainless steel.

4. The combination of claim 2, wherein the spring is made of a stainless steel alloy.

5. A fluid valve assembly comprising:

a valve body having a cavity and fluid inlet and outlet passages communicating with the cavity, the cavity determined by an open side, a circumferential side wall and a bottom wall, the side wall having a circumferential lip disposed generally parallel to and at a preselected height above the bottom wall, the inlet passage opening into the cavity at an inlet port in the bottom wall, the inlet port having a valve seat with a generally circular aperture, the plane of the aperture at a preselected distance from the bottom wall;

a flexible diaphragm disposed across the open side of the cavity to seal and isolate the cavity, the diaphragm having an internal surface facing the cavity, and an external surface;

a ball valve element disposed within the cavity between the valve seat and the internal surface of the diaphragm, the ball having a preselected diameter and being continuously displaceable relative to said aperture between a first (open) position determined by a preselected separation between the ball and aperture, and a second (closed) position wherein the ball engages the valve seat, displacement of the ball when not in the open position being constrained by contact between the diaphragm inner surface and the ball;

an actuator operatively associated with the exterior surface of the diaphragm, the actuator being movable to deflect the diaphragm and displace the ball from the open position; and a generally planar, generally circular spring having therethrough a central circular hole of a preselected diameter less than the diameter of the ball and a symmetrically disposed plurality of slots extending radially from the hole, and a circumferential outer portion with a lower surface, the outer portion bounded by a generally circular rim, the ball disposed within the hole, the outer portion circumscribed by the side wall, said lower surface resting freely on the lip, a generally annular clearance between the rim and side wall.

6. The valve assembly of claim 5, wherein the ball is made of a material selected from the group consisting of ceramic, synthetic ruby, synthetic sapphire, and stainless steel.

7. The valve assembly of claim 5, wherein the spring is made of a stainless steel alloy.

8. The valve assembly of claim 7, wherein said alloy comprises nickel.

9. The valve assembly of claim 5, wherein said plurality of slots is four.

10. The valve assembly of claim 5, wherein said separation between the ball and seat aperture when the ball is in the open position is about 0.004-inch.

11. In a fluid valve assembly, the combination comprising:

a valve body having a cavity and fluid inlet and outlet passages communicating with the cavity, the cavity determined by a circumferential side wall and a bottom wall, the side wall having a circumferential lip disposed generally parallel to and at a preselected height above the bottom wall, the inlet passage opening into the cavity at an inlet port in the bottom wall, the inlet port having a valve seat with a generally circular aperture;

a generally spherical valve element of a preselected diameter disposed within the cavity and adapted to engage the seat to thereby close the inlet port, the valve element displaceable relative to the aperture between a first (open) position determined by a preselected separation between the element and aperture, and a second (closed) position wherein the element engages the seat, thereby closing the inlet port; and means for aligning the valve element with the valve seat at any position between and including said first and second positions, said means including means for allowing the valve element to center itself in the valve seat as the valve element approaches said second position.

12. The combination of claim 11, wherein:

said means for aligning the valve element comprises a generally planar, generally circular spring having therethrough a central circular hole of a preselected diameter less than the diameter of the valve element, and a circumferential outer portion with a lower surface, said outer portion bounded by a generally circular rim circumscribed by said side wall so that there is an annular clearance between the rim and side wall, said lower surface resting freely on said circumferential lip so that the spring is free to move radially, the valve element disposed within the hole.

13. The combination of claim 12, wherein the spring is made of a stainless steel alloy.

14. The combination of claim 12, wherein the valve element is a ball made of a material selected from the group consisting of ceramic, synthetic ruby, synthetic sapphire, and stainless steel.

15. In a fluid valve assembly, the combination comprising:

a valve body having a cavity and fluid inlet and outlet passages communicating with the cavity, the cavity determined by a circumferential side wall and a bottom wall, the side wall having a circumferential lip disposed generally parallel to and at a preselected height above the bottom wall, the inlet passage opening into the cavity at an inlet port in the bottom wall, the inlet port having a valve seat with a generally circular aperture;

a generally spherical valve element of a preselected diameter disposed within the cavity and adapted to engage the seat to thereby close the inlet port, the valve element displaceable relative to the aperture between a first (open) position determined by a preselected separation between the element and aperture, and a second (closed) position wherein the element engages the seat, thereby closing the inlet port; and means for reducing pressure drop in said outlet passage.

16. The combination of claim 15, wherein:

said means for reducing pressure drop comprises a generally planar, generally circular spring having therethrough a central circular hole of a preselected diameter less than the diameter of the valve element, and a circumferential outer portion with a lower surface, said outer portion bounded by a generally circular rim circumscribed by said side wall, said lower surface contacting said circumferential lip, the spring having therethrough a plurality of openings disposed between the central hole and spring outer portion, the valve element disposed within the hole.

17. The combination of claim 16, wherein the spring is made of a stainless steel alloy.

18. The combination of claim 16, wherein said openings are slots extending radially from the central hole.

* * * * *

UNITED STATES PATENT AND TRADEMARK OFFICE
CERTIFICATE OF CORRECTION

PATENT NO : 6,138,990
DATED : Oct. 31, 2000
INVENTOR(S) : Charles F. Drexel

It is certified that error appears in the above-identified patent and that said Letters Patent are hereby corrected as shown below:

At column 1, line 22, change "(seem)" to --(sccm)--.

At column 1, line 23, change "(seem)" to --(sccm)--.

At column 3, lines 40-45, delete
"[, and means for keeping the valve element aligned with the valve seat at any position between the open and closed positions. The combination further includes means for allowing the valve element to center itself in the seat, and means for reducing pressure drop in the outlet passage]".

Signed and Sealed this

Eighth Day of May, 2001

Attest:

NICHOLAS P. GODICI

Attesting Officer

Acting Director of the United States Patent and Trademark Office